Sept. 3, 1935.        P. DALTON        2,013,603

PLOTTING AND COMPUTING DEVICE

Filed June 1, 1933

INVENTOR: Philip Dalton

Patented Sept. 3, 1935

2,013,603

UNITED STATES PATENT OFFICE 2,013,603

PLOTTING AND COMPUTING DEVICE

Philip Dalton, Washington, D. C.

Application June 1, 1933, Serial No. 673,903

15 Claims. (Cl. 33—76)

My invention relates to improvements for navigation and map making and for the solution of problems in plane geometry.

In the navigation of military aircraft especially over water the solution of the drift and interception triangles and the plotting of the plane's tracks must be accomplished quickly and with the fewest manual operations possible. In some cases it is desirable for the pilot to keep one hand on the controls and do all navigational plotting with the other hand. And in any case the plotting equipment should be as simple and as nearly self-contained as possible. The traditional parallel rulers and dividers for plotting on navigation charts are too cumbersome and too easily lost in the open cockpit of a military airplane.

An object of my invention is to construct an improved instrument which is simple and self contained and which may be used to solve any vector triangle more rapidly than has hitherto been possible with any instrument or set of instruments known in the prior art.

A further object of my invention is to construct such an instrument which can be used to solve the problems of navigation and surveying and more particularly a self contained instrument which can be used to perform all the functions of a chart with a compass rose, linear scales, parallel rulers and dividers.

Another object is to provide such an instrument having means for automatically applying a correction for the variation of magnetic bearings from true bearings in navigational plotting.

A still further object of my invention is to provide improved means for completing the plotting of a triangle by finding the direction of the third side only the length of which is known.

A still further object of my invention is to provide an instrument of this type which can be constructed with only one moving element and which is therefore relatively inexpensive to manufacture, durable, and easy to use with one hand.

I attain these objects in one form of my invention by a transparent plate with a top surface suitable for writing and with a compass rose printed on it underneath which plate is pivoted a disk on which are inscribed an index and a variation scale coacting with the compass rose, diametric linear scale disposed at right angles to each other, one of said linear scales coinciding with the index, a grid formed of parallel lines spaced in accordance with these scale, and concentric circles or arc of circles spaced in accordance with the same scales.

Figure 1:
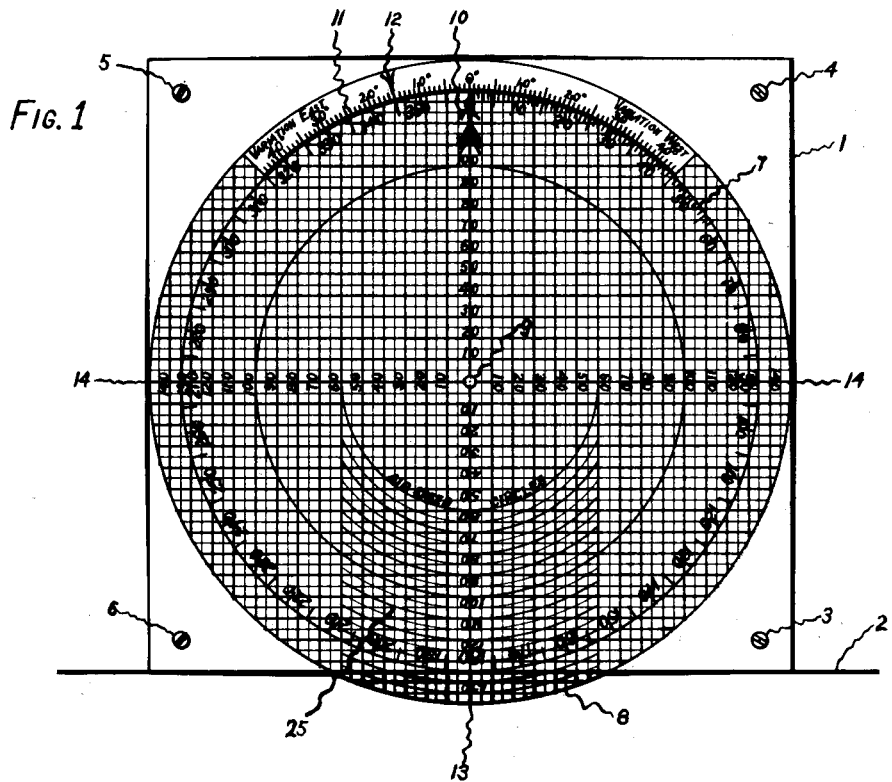
Figure 2:
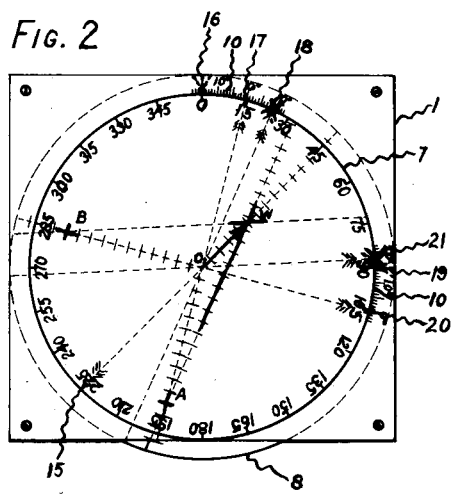
Figure 3:
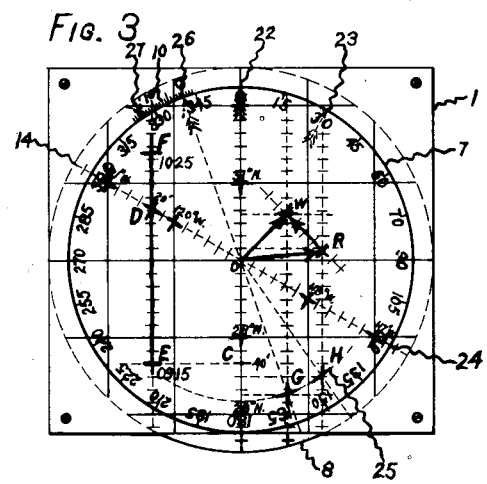

In the accompanying drawing similar numerals refer to similar parts in the various views. Fig. 1 is a plan view of this form of the device. Fig. 2 is a diagrammatic sketch showing how the instrument is used to plot the wind vector by various methods. Fig. 3 illustrates how it is used to construct an approximate Mercator chart, to plot tracks, and to solve the drift and interception triangles in navigation.

Referring to Fig. 1 the rectangular transparent plate I, made of celluloid or other suitable material with a roughened surface on which pencil marks may be made and erased, is shown fastened on and flush with the lower edge of a fixed chart table or board 2 by screws 3, 4, 5, and 6. The transparent top plate has only the compass rose 7 printed on it, preferably in black. The disk 8 is made of thin celluloid or other durable material, is pivoted to plate I at its center by pin 9 and is printed with the rest of the design shown in Fig. 1, preferably in red or other bright color to give contrast to black pencil marks made on the transparent plate I over it. As shown in Fig. 1 the lower edge of disk 8 protrudes out from under plate I and over the edge of the supporting table or chart board 2 so that the disk can be rotated with the fingers to any desired orientation marked by the index arrow 10 on the disk, coacting with the compass rose 7 on the fixed plate I.

The scale II extending around on either side of the main index arrow 10 on disk 8 is for pencil-marking an additional index such as 12 to serve as an index for magnetic bearings equivalent to the true bearings marked by arrow 10 and will in subsequent discussion be referred to as the variation scale. This index for magnetic bearings must be pencil-marked to the right or left of arrow 10 the number of degrees magnetic North varies East or West of true North for the locality in which one wishes to navigate. To pencil-mark the variation or to erase old marks the disk 8 is turned until the desired portion of the scale II is exposed at the bottom of the plotter. The scale II is also used to measure the drift angle in the solution of drift triangles as hereinafter described.

The linear diametric scales 13 and 14 at right angles to each other are both graduated from the center outward and labelled. The grid lines parallel to diametric scale 13 which includes the main index arrow 10 are to facilitate freehand tracing of straight lines anywhere on the top plate on any true bearing as marked by arrow 10 and the equivalent magnetic bearing as pencil-marked on the variation scale 11. These lines parallel to scale 13 and arrow 10 will for brevity in the following description be called the plotting lines and scale 13 will be called the index scale. These lines used in conjunction with the compass rose on plate 1 enable one to perform by freehand drawing the function of parallel rulers used in conjunction with the compass rose on an ordinary navigational chart. The grid lines parallel to diametric scale 14 will hereinafter be called the "scalar lines". Both sets of parallel lines composing the grid are uniformly spaced in conformity with the equally divided diametric scales.

The scalar lines are primarily for measuring the lengths of pencil lines traced by means of the plotting lines, either by counting scalar lines or by following the scalar lines over to the index scale 13. Thus one can use the scalar lines by freehand methods to perform the function of a loose scale or of a fixed scale and dividers. It will be apparent that neither the scale 14 nor the scalar lines are a necessary part of my invention since it will be seen that by rotating the index lines 90° I can use them to perform the function of the scalar lines.

The concentric circular arcs 25 extending on either side of the index scale 13 at the end opposite the main index arrow 10 are labeled "air speed circles" and are used in solving drift and interception triangles as will be explained later. They are used to perform the function of dividers in completing a triangle by finding the direction of the third side, only the length of which is known.

Referring now to Figs. 2 and 3; the transparent top plate 1, its compass rose 7, and pencil marks made on the top plate are shown by full heavy lines while the disk 8 underneath it and a few of the grid lines and other disk markings are shown in broken lines. Fig. 2 shows the wind vector OW as plotted in pencil by one of the following three methods. First method: if the wind direction and force are known from aerological data the wind vector OW is plotted from the center O directly along the index scale after turning the main index arrow around compass rose 7 to the bearing from which the wind is blowing as shown at 15 in Fig. 2. Second method: If the drift and ground speed on one magnetic heading are known the wind vector is plotted as follows. Turn the pencil-marked magnetic index to the magnetic heading as shown at 16. This properly orients the main index arrow and index scale on the corresponding true heading as shown at 17. Then mark the heading and air speed vector AO by a small cross at A and mark the track bearing on compass rose 7 by another cross at 18 using the variation scale 10 to measure off the drift angle 17—18. Then turn the main index arrow to the track bearing just marked at 18, and using the plotting lines to mark the direction and the scalar lines to mark the length of the track and ground speed vector AW, complete the drift triangle by marking a cross at W. Third method: if the ground speed on track AW is not known trace the line AW a reasonable distance either side of the center O. Then find the point W at the intersection of this line and a second track line BW plotted in the same manner from the end of a second heading and air speed vector BO as shown plotted on true heading 20 and magnetic heading 19 with the second drift angle 20—21 and track bearing 21.

Fig. 3 shows the method of constructing an approximate Mercator chart, of plotting a position in latitude and longitude on the chart, and of solving the drift triangle to find the ground speed and heading to make good a specified track. To construct an approximate Mercator chart turn the main index arrow to true North or bearing 0° as shown at 22, in which position the vertical index scale serves as a scale of both miles and minutes of latitude. Mark with crosses the 60 and 120 mile divisions of the index scale, above and below the center, choose a convenient mid-latitude for the center, and label these crosses the appropriate degrees of latitude North and South of mid-latitude. Then draw horizontal latitude lines through these labeled marks. Next turn the main index scale arrow to the bearing on compass rose 7 which has the value in degrees of the mid-latitude as shown at 23. In this position of the disk the diametric scale 14 at right angles to the index scale is inclined to the horizontal an angular amount equal to the mid-latitude as shown at 24. Since the ratio of the longitude scale to the latitude scale at the mid-latitude of a Mercator chart is practically the cosine value of the mid-latitude, this rotation of the scale 14 from the horizontal gives its vertical projection the proper cosine value for use as a scale of minutes of longitude. With the scale thus inclined mark the 60 and 120 mile divisions on either side of the center and label them appropriate degrees of longitude. Finally turn the main index arrow back to 0° and using the plotting lines draw in the meridians of longitude vertically through these labeled marks. If my chart is to be used in aerial navigation all these Mercator lines may be drawn in with a ruler before starting the flight. Skilled users of the instrument may prefer to omit them.

To plot a position turn the index scale to the vertical position and mark the latitude as shown at C. Then turn the index arrow again to the mid-latitude as shown at 23 and mark the longitude as shown at D. Finally return the index scale to the vertical position and plot the desired position at E, the intersection of the grid lines which pass through the latitude mark C and the longitude mark D.

To solve a drift triangle and plat a specified track such as EF, Fig. 3, which represents an hour and ten minutes flight made good on track 0° from position E with the specified air speed GO and wind OW, proceed as follows. First the wind vector OW must be plotted by one of the three methods previously mentioned. Then turn the main index arrow to the specified track bearing 0° as shown at 22 and using the plotting lines trace the desired track EF from point E. At the same time complete the drift triangle for this track by marking a cross as shown at G at the intersection of the plotting line WG and the proper air speed circle 25. Read the ground speed by measuring the length of WG by means of scalar lines and record it for computing dead reckoning positions along the track EF such as the point F for 1 hour and 10 minutes of flight at this ground speed. Finally turn the disk 8 to orient the index scale under the plotted point G in order to read the true heading GO at 26 equivalent to the magnetic heading at 27 which is required to make good this track.

This method of solving the well known drift triangle to find the required heading and resulting ground speed in making good a specified track at a specified air speed may be duplicated to solve the interception triangle to find the required heading and resulting rate of interception in making good or maintaining an initial line of bearing at a specified air speed in the interception of a ship or other moving object.
In this case the true wind vector OW is replaced by a relative wind vector OR which represents the wind relative to the moving object to be intercepted. Such a relative wind vector may be plotted as shown at R by subtracting vectorially the ship's speed vector WR from the end of the true wind vector OW. Then to solve the interception triangle orient the plotting lines and index arrow on the initial line of bearing by turning the disk to bring the marked simultaneous positions of the plane and ship at the beginning of interception over the same plotting line. This operation is not shown on Fig. 3 but for simplicity assume that the dead reckoning showed that the ship would be due North of the plane at the time you plan to start interception. This orientation of a plotting line under the simultaneous positions would then leave the main index arrow on bearing 0° as shown at 22 To complete the interception triangle mark a cross as shown at H at the intersection of the plotting line RH and the specified air speed circle 25. The rate of interception RH and the direction of the required true interception heading HO and equivalent magnetic heading are read in the same manner as for the drift triangle. The interception track HW is plotted like any other track after the disk is oriented to bring points H and W over the same plotting line.

There are several variations of these solutions of the drift and interception triangles as described above such as finding the track and ground speed for a specified heading and air speed, finding the heading and air speed required to make good an interception at a specified rate of interception, finding the true wind from the relative wind plotted from two apparent drift angles obtained by flying over the foremast of a moving ship, etc., all of which can be easily performed by the same general methods. There are also many other problems in surveying, map making, plane geometry, etc., for which this invention is useful.

From the foregoing description of the instrument and the method of operation thereof, it will be apparent that it may be used to perform the several functions specified without necessitating the use of more than one hand on the part of the operator.

This advantage of my instrument becomes particularly important when it is used for navigational plotting by a pilot of an airplane who must keep at least one hand on the controls.

In describing the preferred form of my invention I have specified that the top plate is transparent and has a writing surface. It will be clear that under some circumstances it may be desirable to place a removable transparent writing surface over the top transparent plate. Such an arrangement may be especially desirable when it is advantageous to remove and file charts prepared by the use of my apparatus.

It will also be apparent that while I have described an apparatus in which the top plate is fixed and the lower plate is rotatable, the relationship is purely relative and may be reversed.

Although in accordance with the provisions of the patent statutes I have described my invention in one particular form designed for certain specific uses, I would have it distinctly understood that the form disclosed and the methods of use described are merely illustrative and that the invention is not limited thereto since modifications, alterations, and equivalent mechanisms will readily suggest themselves to workers skilled in this art without departing from the true spirit of this invention or from the scope of the annexed claims.

I claim:

1. A plotting and computing device including two plates mounted for rotation with respect to each other the top one of said plates being transparent and the lower one of said plates having delineated thereon a series of parallel lines, one of said plates having delineated thereon a circular compass rose concentric with the axis of rotation and the other of said plates having an index and a curved scale delineated thereon in juxtaposition to said compass rose, said curved scale being graduated for angular measurements on either side of said index.

2. A plotting and computing device including two plates mounted for rotation with respect to each other the top one of said plates being transparent and the lower one of said plates having delineated thereon a series of parallel lines said lines being spaced in accordance with a scale at right angles thereto, one of said plates having delineated thereon a circular compass rose concentric with the axis of rotation and the other of said plates having an index and a curved scale delineated thereon in juxtaposition to said compass rose said curved scale being graduated for angular measurements on either side of said index.

3. A plotting and computing device including two plates mounted for rotation with respect to each other the top one of the said plates being transparent and the lower one of said plates having delineated thereon a series of parallel lines said lines being spaced in accordance with a scale at right angles thereto, and a second series of parallel lines located at right angles to said first series and likewise spaced in accordance with a scale at right angles thereto, one of said plates having delineated thereon a circular compass rose concentric with the axis of rotation and the other of said plates having an index and a curved scale delineated theeron in juxtaposition to said compass rose said curved scale being graduated for angular measurements on either side of said index.

4. A plotting and computing device including two plates mounted for rotation with respect to each other the top one of said plates being transparent and the lower one of said plates having delineated thereon a diametric line, a series of lines parallel thereto and a series of air speed arcs concentric with the axis of rotation and extending on either side of said diametric line, one of said plates having an index in juxtaposition to said compass rose.

5. A plotting and computing device including two plates mounted for rotation with respect to each other the top one of said plates being transparent and the lower one of said plates having delineated thereon a diametric line, a series of lines parallel thereto and spaced in accordance with a scale at right angles thereto and a series of arcs of circles concentric with the axis of rotation also spaced in accordance with said scale and extending on either side of said diametric line, one of said plates having delineated thereon a compass rose concentric with the axis of rotation and the other of said plates having an index in juxtaposition to said compass rose.

6. A plotting and computing device including two plates mounted for rotation with respect to each other the top one of said plates being transparent and the lower one of said plates having delineated thereon two diametric linear scales at right angles to each other, a grid formed of two series of lines parallel respectively to said scales and spaced in accordance therewith and a series of arcs of circles concentric with the axis of rotation and extending on either side of one of said scales said series of arcs being spaced in accordance with one of said scales, one of said plates having delineated thereon a compass rose concentric with the axis of rotation and the other of said plates having an index in juxtaposition to said compass rose.

7. A plotting and computing device including two plates mounted for rotation with respect to each other the top one of said plates being transparent and the lower one of said plates having delineated thereon a diametric line, a series of lines parallel thereto and spaced in accordance with a scale at right angles thereto and a series of arcs of circles concentric with the axis of rotation also spaced in accordance with said scale and extending on either side of said diametric line, one of said plates having delineated thereon a compass rose concentric with the axis of rotation and the other of said plates having an index and a curved scale delineated thereon in juxtaposition to said compass rose said curved scale being graduated for angular measurements on either side of said index.

8. A plotting and computing device including two plates mounted for rotation with respect to each other the top one of the said plates being transparent and the lower one of said plates having delineated thereon two diametric linear scales at right angles to each other, a grid formed of two series of lines parallel respectively to said scales and spaced in accordance therewith and a series of arcs of circles concentric with the axis of rotation and extending on either side of one of said scales said series of arcs being spaced in accordance with one of said scales, one of said plates having delineated thereon a compass rose concentric with the axis of rotation and the other of said plates having an index and a curved scale delineated thereon in juxtaposition to said compass rose said curved scale being graduated for angular measurements on either side of said index.

9. A plotting and computing device including two plates mounted for rotation with respect to each other the top one of said plates being transparent and the lower one of said plates having delineated thereon two diametric linear scales at right angles to each other and a grid formed of two series of lines parallel respectively to said scales and spaced in accordance therewith one of said plates having delineated thereon a compass rose and a series of circles concentric with the axis of rotation said circles being spaced in accordance with one of said scales and the other of said plates having an index in juxtaposition to said compass rose.

10. A plotting and computing device including two plates mounted for rotation with respect to each other the top one of said plates being transparent and having a compass rose delineated thereon concentric with the axis of rotation the lower one of said plates having delineated thereon an index line to cooperate with said compass rose, a series of lines parallel to said index line and a curved scale in juxtaposition to said compass rose said scale being graduated for angular measurements on either side of said index line.

11. A plotting and computing device including two plates mounted for rotation with respect to each other the top one of said plates being transparent and having a compass rose delineated thereon concentric with the axis of rotation the lower one of said plates having delineated thereon an index line to cooperate with said compass rose, a scalar line at right angles to said index line, a series of lines parallel to said index line and a series of lines parallel to said scalar line all of said parallel lines being spaced in accordance with scalar divisions on said index and scalar lines, and a curved scale in juxtaposition to said compass rose said scale being graduated for angular measurements on either side of said index line.

12. A plotting and computing device including two plates mounted for rotation with respect to each other the top one of said plates being transparent and having a compass rose delineated thereon concentric with the axis of rotation the lower one of said plates having delineated thereon a diametric index line, a series of lines parallel to said index line and a series of arcs of circles concentric with the axis of rotation and extending on either side of said index line.

13. A plotting and computing device including two plates mounted for rotation with respect to each other the top one of said plates being transparent and having a compass rose delineated thereon concentric with the axis of rotation the lower one of said plates having delineated thereon a diametric index line, a grid composed of two series of lines parallel respectively to said index and scalar lines and spaced in accordance with scalar divisions on said index and scalar lines and a series of arcs of circles concentric with the axis of rotation likewise spaced in accordance with the scalar divisions on said index line and extending on either side of said index line.

14. A plotting and computing device including two plates mounted for rotation with respect to each other the top one of said plates being transparent and having a compass rose delineated thereon concentric with the axis of rotation the lower one of said plates having delineated thereon a diametric index line, a series of lines parallel to said index line, a series of arcs of circles concentric with the axis of rotation and extending on either side of said index line and a curved scale graduated for angular measurements on either side of said index line.

15. A plotting and computing device including two plates mounted for rotation with respect to each other the top one of said plates being transparent and having a compass rose delineated thereon concentric with the axis of rotation the lower one of said plates having delineated thereon a diametric index line, a scalar line at right angles to said index line, a grid composed of two series of lines parallel respectively to said index line and scalar lines spaced in accordance with scalar divisions on said index and scalar lines, a series of arcs of circles concentric with the axis of rotation likewise spaced in accordance with the scalar divisions on said index line and extending on either side of said index line, and a curved scale graduated for angular measurements on either side of said index line.

PHILIP DALTON.